United States Patent [19]

Edwards et al.

[11] 4,312,475
[45] Jan. 26, 1982

[54] FLOW ADJUSTMENT MECHANISM FOR AIR DISTRIBUTOR SYSTEMS

[75] Inventors: Douglas F. Edwards; Ronald S. Zimmer, both of Jackson County, Mo.; Raymond H. Dean, Johnson County, Kans.

[73] Assignee: Tempmaster Corporation, Kansas City, Mo.

[21] Appl. No.: 201,226

[22] Filed: Oct. 27, 1980

[51] Int. Cl.³ .............................................. F24F 7/06
[52] U.S. Cl. ........................................ 236/49; 137/84; 236/82
[58] Field of Search .............. 236/49, 82, 80 F, 80 R; 137/84

[56] References Cited

U.S. PATENT DOCUMENTS

| | | | |
|---|---|---|---|
| 3,125,109 | 3/1964 | Kreuter | 236/82 X |
| 3,941,310 | 3/1976 | Travaglio | 236/80 R X |
| 3,994,434 | 11/1976 | Boyer et al. | 236/49 |
| 4,077,567 | 3/1978 | Ginn et al. | 236/49 |
| 4,231,515 | 11/1980 | Ring, Jr. | 236/49 X |

Primary Examiner—William E. Tapolcai, Jr.
Attorney, Agent, or Firm—Lowe, Kokjer, Kircher, Wharton & Bowman

[57] ABSTRACT

An adjustment mechanism for adjusting the maximum flow rate of conditioned air in an air distribution system controlled by a pneumatic control circuit. An air bladder controls the distribution of air, and the pressure is bled from the bladder under the control of a diaphragm against which pressure is fed back from the downstream side of the bladder. The control orifice through which the bladder pressure is exhausted is formed in the end of an exhaust tube that is axially adjustable. A cam and set screw arrangement serves to extend and retract the exhaust tube to move the control orifice toward and away from the diaphragm for adjustment of the maximum flow rate.

14 Claims, 4 Drawing Figures

FLOW ADJUSTMENT MECHANISM FOR AIR DISTRIBUTOR SYSTEMS

BACKGROUND AND SUMMARY OF THE INVENTION

This invention relates in general to a pneumatic circuit for controlling an air distribution system. More specifically, the invention relates to a mechanism for adjusting the control circuit in a manner to vary the maximum flow rate of conditioned air in the air distribution system.

The heating and cooling of relatively large buildings such as office buildings is normally accomplished by passing conditioned air through ventilating ducts which direct the conditioned air to separate rooms of the building. Individual temperature control for the separate offices or other sections of the building is achieved by controlling the volume of air flow through the duct or through the air outlet which discharges the conditioned air from the duct into the room. Typically, a flow control device is provided in the duct or outlet to regulate the flow of conditioned air to an air diffuser or similar outlet device, thereby controlling the room temperature. This type of air distribution system is generally high in efficiency and low in cost since it utilizes a single large heating or cooling unit to supply several rooms or floors of the building. At the same time, there is no sacrifice in the individual temperature control for each office.

As disclosed subsequently herein, it is possible in this type of air distribution system to provide a pneumatic control circuit that controls the flow rate of conditioned air such that it is virtually independent of the main supply pressure. As a result, the fluctuations that inevitably occur in the supply pressure have no appreciable effect on the flow of conditioned air into the room that is to be heated or cooled. Although such control circuits function well for the most part, the fact that the maximum air flow is constant is sometimes detrimental to the performance of the system. In many instances, it is desirable to provide a field adjustable upper limit on the maximum air flow. It is also desirable to provide an independent factory calibration of the maximum flow rate in order to compensate for any small physical variations that are present in the mechanical components of the system.

The maximum air flow can be made adjustable by installing a needle valve or other constriction in the thermostat line. By adjusting the needle valve, the rate of bleeding of air from the pneumatic relay can be varied, thus varying the flow rate at the equilibrium condition of the circuit. However, needle valves and the like are relatively expensive components that add significantly to the overall cost and are not suitable when independent factory calibration and field adjustment are required. Furthermore, there is a risk of leakage in the low flow calibration line.

Equally significant, restricting the thermostat line results in a shift in the size relationship among the orifices in the lines that connect with the high pressure side of the pneumatic relay. Proper selection of the orifice sizes is important in achieving pressure independent control since the supply pressure is transmitted through different orifices to the opposite sides of the diaphragm in the relay. The effect of the supply pressure is small and tends to cancel itself, and it can be made to exactly cancel itself for all practical purposes by proper selection of the orifices. However, the use of a needle valve or other adjustable restriction effectively changes the size of one orifice relative to the others and disrupts the relationship among the orifices. Consequently, the pressure independence of the control circuit is destroyed and its overall performance suffers accordingly.

As an alternative to the use of a needle valve or other adjustable restriction, the maximum air flow rate can be made adjustable by providing an adjustment of the equilibrium distance between the diaphragm and the control orifice that bleeds pressure from the air bladder. This changes the feedback pressure that must be applied to the relay at the equilibrium condition and thus changes the flow rate of conditioned air from the ventilating duct. In devising a suitable mechanism for effecting such an adjustment, it is important to avoid introducing potential leaks on the high pressure side of the pneumatic relay below the diaphragm. Leakage above the diaphragm is not particularly objectionable because the top side of the diaphragm is vented to atmosphere. It is equally important to avoid applying off-center torques to the diaphragm or torques that are difficult to reproduce. The adjustment mechanism should also avoid the use of expensive seals and the need to twist the connecting tubes when making adjustments. As indicated previously, another requirement of the adjustment mechanism is that it provide for factory calibration and field adjustment on an independent basis.

The present invention satisfies all of these requirements and at the same time provides a simple and effective device for accurately adjusting the maximum flow rate in the air distribution system. In accordance with the invention, the control orifice which controls bleeding of the air bladder is adjustable toward and away from the top surface of the diaphragm. The exhaust tube which terminates in the control orifice is received in another tube for telescoping extension and retraction. The tube assembly is spring loaded and includes an off-center set screw which rides on a cam. Rotation of the cam extends and retracts the exhaust tube to thereby adjust the position of the control orifice relative to the diaphragm. The set screw is used for factory calibration and the cam is used for independent field adjustment, with neither setting altering the relationship among the orifices. The cam has a pointer and an associated scale to indicate its rotative position which corresponds with the percent of maximum air flow at each setting of the cam.

DETAILED DESCRIPTION OF THE INVENTION

In the accompanying drawing which forms a part of the specification and is to be read in conjunction therewith and in which like reference numerals are used to indicate like parts in the various views.

Figure 1:
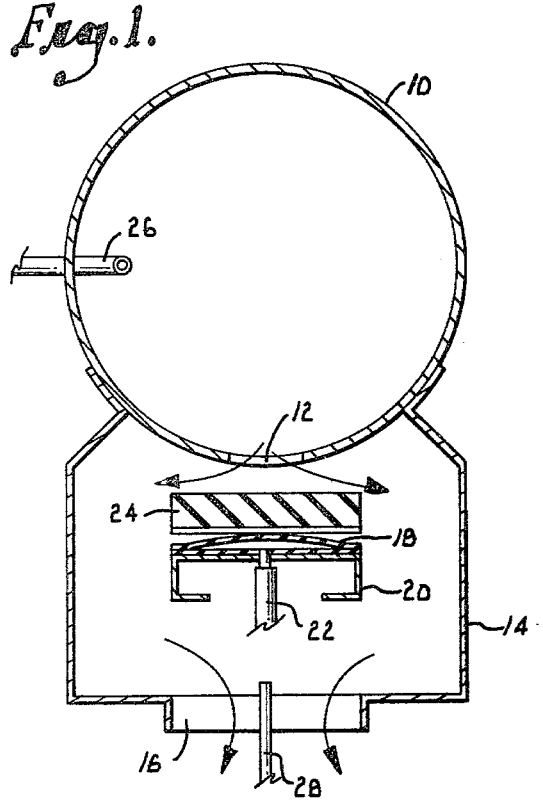
FIG. 1 is a sectional view taken on a vertical plane through a ventilation duct and air diffuser forming part of an air distribution system which is equipped with a pneumatic control system and adjustment mechanism constructed according to a preferred embodiment of the present invention.

Referring initially to FIG. 1, numeral 10 identifies a cylindrical duct which receives conditioned air from a suitable heating or cooling unit (not shown). The conditioned air is supplied to duct 10 at a relatively high supply pressure and is discharged from the duct at a relatively low pressure through an elongate outlet slot 12 formed in the bottom of the duct. An air diffuser 14 receives the air discharge through slot 12 and distributes the air to a room or other area which is to be heated or cooled. The air is directed into the room through a slot 16 in the bottom of the air diffuser.

The flow of conditioned air through slot 12 is controlled by an inflatable air bag or bladder 18 which is shown in the fully deflated condition in FIG. 1. Bladder 18 is supported on top of a metal pan 20 located within the diffuser structure 14. Air for inflation of bladder 18 is supplied thereto by a conduit 22. A foam pad 24 is disposed above bladder 18 and is moved toward and away from slot 12 upon inflation and deflation of the bladder. When the bladder is fully inflated, pad 24 seals slot 12 to prevent discharge of air therefrom. In the fully deflated condition of the bladder shown in FIG. 1, pad 24 is located well below slot 12 to permit the conditioned air to flow essentially freely out of the slot and into the room.

A supply pressure pickup fitting 26 picks up the main supply pressure of the conditioned air in duct 10. Fitting 26 is in the form of an open ended tube having its open end facing in a direction to receive the air which is forced through duct 10 by a fan (not shown). A flow sensor 28 is located adjacent slot 16 on the low pressure side of bladder 18 in order to sense the quantity of the air discharged through slot 12. The flow sensor 28 may take the form of an open ended tube having its open end facing upwardly within the diffuser structure 14 and below slot 12. Alternatively, the flow sensor may be a long perforated manifold. The pressure in the flow sensor is determined primarily by the pressure drop across the diffuser which directs air into the room.

Figure 2:
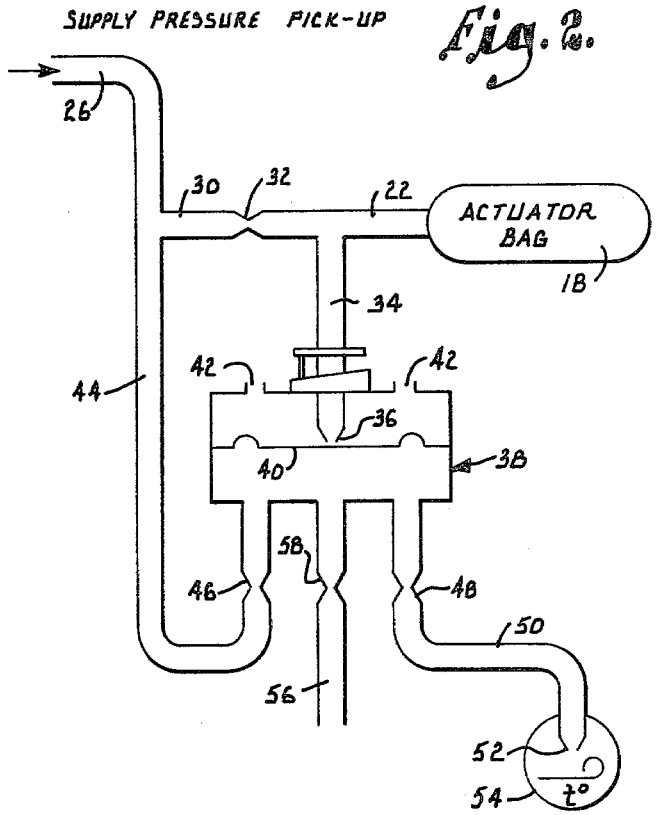
FIG. 2 is a schematic diagram of the pneumatic control circuit.

Referring now more particularly to the pneumatic control circuit shown in FIG. 2, the supply pressure pickup fitting 26 has a Tee connection with a conduit 30 which leads to the conduit 22 which supplies the actuator bag or bladder 18. The conduit 30 is provided with an orifice 32 having a diameter of approximately 0.045" in a preferred form of the invention. An exhaust line 34 serves to bleed pressure from bladder 18 in order to effect deflation of the bladder and increased flow through slot 12. The exhaust line 34 connects at a right angle with conduit 22. Line 34 terminates in a control orifice 36 which is located within the casing of an amplifying relay generally indicated at 38. Orifice 36 is located centrally above a flexible diaphragm 40 mounted within the casing of the relay. The upper side of diaphragm 40 is vented to atmosphere through one or more vent openings 42, and the pressure above diaphragm 40 is thus atmospheric except for the small area of orifice 36. It is to be noted that when diaphragm 40 is displaced upwardly, it closes off the control orifice 36 to prevent bleeding of pressure from bladder 18. The weight of the diaphragm, in cooperation with a spring (not shown) if desired, urges the diaphragm downwardly toward the open position. As will be more fully explained, the distance of the control orifice 36 from diaphragm 40 is adjustable.

A conduit 44 extends from the intersection between fitting 26 and conduit 30 and into the bottom of relay 38 to communicate with the underside of diaphragm 40. Conduit 44 has an orifice 46 which is located between conduit 30 and the underside of the diaphragm and has a diameter of approximately 0.007" in a preferred form of the invention. Conduit 44 serves to apply the supply pressure, through orifice 46, to the underside of diaphragm 40.

Extending from the underside of the diaphragm 40 is a short conduit 50 which is provided with a limiting orifice 48 and a terminating orifice 52. Orifice 48 preferably has a diameter of approximately 0.020". A conventional thermostat 54 controls the flow through orifice 52. Thermostat 54 is located in the room that is to be heated or cooled and responds to temperature changes in a manner to open and close orifice 52. For example, if the air distribution system is operating in the cooling mode, thermostat 54 is set to open orifice 52 to an equivalent diameter much larger than that of orifice 48 when the temperature in the room exceeds the temperature level set on the thermostat. When the room temperature is below the setting of the thermostat, orifice 52 is closed.

The velocity sensor 28 connects with a conduit 56 which leads through an orifice 58 to the underside of diaphragm 40. The relatively low pressure at the velocity sensor is thus transmitted through orifice 58 and is applied against the underside of diaphragm 40 along with the pressure transmitted through orifice 46. In a preferred embodiment of the invention, orifice 58 has a diameter of approximately 0.010". The size or orifice 58 is thus considerably less than that of orifice 48 but is greater than that of orifice 46.

Figure 3:
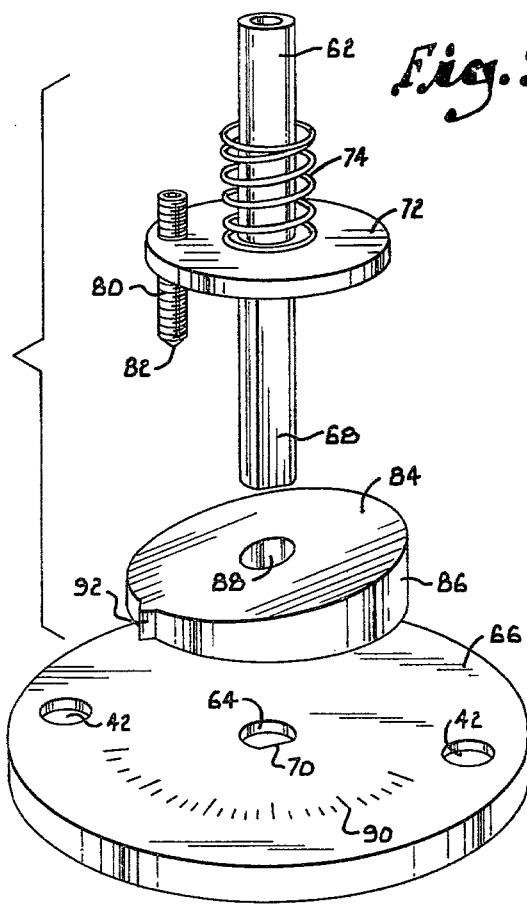
FIG. 3 is an exploded perspective view of the adjustment mechanism associated with the pneumatic control circuit.
Figure 4:
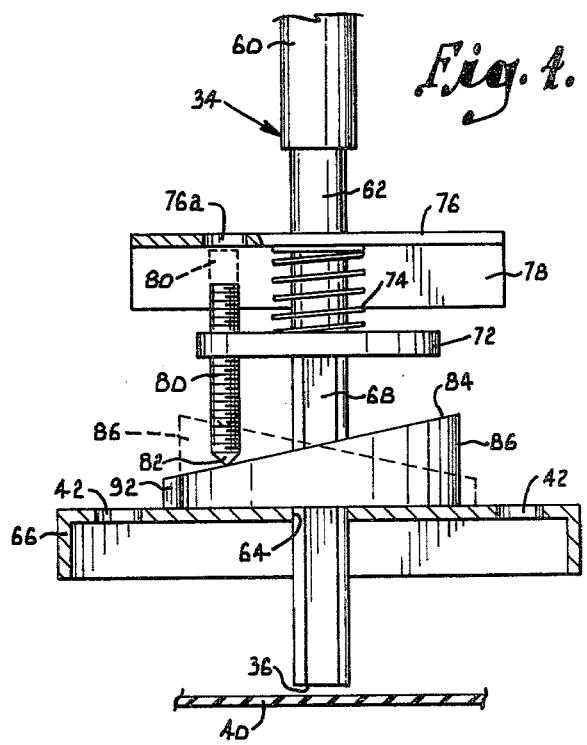
FIG. 4 is a fragmentary elevational view of the adjustment mechanism, with portions broken away for illustrative purposes.

Referring now to FIGS. 3 and 4 in particular, the present invention provides a mechanism which is used to adjust the distance of orifice 36 from the upper surface of diaphragm 40. In accordance with the invention, the exhaust tube 34 includes a flexible outer tube which connects at one end with conduit 22. Inserted in the opposite end of tube 60 is a somewhat smaller tube 62. Tubes 60 and 62 are in fluid communication with one another, and the control orifice 36 is formed in the end of tube 62 opposite its connection with tube 60. Consequently, extension of tube 62 moves orifice 36 closer to diaphragm 40, while retraction of tube 62 moves the control orifice away from the diaphragm. Tube 62 extends into the housing of relay 38 through an opening 64 formed in the top portion 66 of the housing. Tube 62 has a flat 68 on one side which engages a flat 70 formed on one side of opening 64, thus preventing tube 62 from rotating.

A disc 72 is rigidly connected with tube 62 in outward projection therefrom. A compression spring 74 acts against disc 72 at one end and at the other end against a bracket formed by a flat mounting plate 76. The mounting plate permits the tube assembly to be mounted on a stationery support 78. Tube 62 fits slidably through plate 76 such that the compression spring 74 continuously urges disc 72 and tube 62 downwardly toward diaphragm 40.

A set screw 80 is threaded through disc 72 at a location outboard of tube 62. The set screw 80 is parallel to tube 62 and terminates in a pointed tip 82 which rides on an incline cam surface 84 of cam 86. The cam 86 is received on the upper surface of housing 66 and has a central opening 88 (FIG. 3) which loosely receives tube 62. Cam 88 is thus rotatable about the axis of the tube.

The cam surface 84 is inclined relative to axis of tube 62 such that rotation of the cam moves set screw 80 up and down by camming action. The set screw thus acts as a cam follower. The mounting plate 76 has an access opening 76a aligned with screw 80 so that a screwdriver or wrench can be used to turn the set screw in order to adjust its position if necessary or desirable.

A graduated scale 90 is provided in an arcuate arrangement on the upper surface of housing 66. Cooperating with scale 90 is an indicator in the form of a pointer 92 projecting from the periphery of cam 86.

In operation, the pneumatic circuit controls the extent to which bladder 18 is inflated and thus controls the flow of conditioned air into the room that is being heated or cooled. If the air distribution system is operating in the cooling mode and the room temperature is at or below the setting of thermostat 54, the thermostat is closed. The supply pressure is then transmitted through conduits 30 and 44 (and through orifice 46) to the underside of diaphragm 40, thereby forcing the diaphragm upwardly to close orifice 36. Since this closes exhaust line 34, the supply pressure is applied to bladder 18 (through orifice 32) to inflate the bladder and thus close off the outlet slot 12 of duct 10. The pressure at the velocity sensor 28 is essentially atmospheric pressure under these conditions. A typical supply pressure at fitting 26 is approximately 1" W. G., while a typical pressure on the closed or bottom side of diaphragm 40 is approximately 0.1" W. G. Consequently, the pressure differential across orifice 46 is considerably greater than the differential across orifice 58, and the constriction provided by orifice 58 permits the pressure to build up below diaphragm 40 to the extent necessary to effect closing of the control orifice 36. The result is that bladder 18 is maintained in a fully inflated condition to close off slot 12 when there is no demand for cool air.

If the temperature in the room rises above the setting of thermostat 54, the thermostat opens to bleed off the pressure below diaphragm 40 through orifice 48 and the thermostat orifice 52. The constriction provided by the small (0.007") orifice 46 permits the pressure below diaphragm 40 to approach atmospheric pressure, and the weight of the diaphragm causes it to move downwardy to open orifice 36. Pressure is then bled from bladder 18 through the exhaust line 34 and through orifice 36 and the vent opening 42. This effects deflation of bladder 18 and opens slot 12 to permit conditioned air to flow into the room. As the flow through the duct outlet increases, the pressure increases at the velocity sensor 28, and, if the flow becomes high enough, the pressure at the velocity sensor builds up to the level necessary to close diaphragm 40. The velocity sensor pressure is applied through orifice 58 to the underside of the diaphragm, and eventually an equilibrium or balance point is reached where a relatively constant flow of conditioned air is directed into the room. An excessively high rate of air flow into the room is precluded due to the action of the velocity sensor.

When thermostat 54 is partially open, the pressure below diaphragm 40 is maintained by a combination of the supply pressure, as transmitted through conduits 30 and 44, and the velocity sensor pressure, as transmitted through conduit 56. If the flow through opening 12 is low, the pressure at the velocity sensor is relatively low and there is not enough pressure applied to the underside of the diaphragm to maintain it closed. Consequently, the control orifice 36 is open and air is bled from bladder 18, thereby increasing the air flow through slot 12. Conversely, if the air flow is relatively high, the flow at the velocity sensor increases the pressure below the diaphragm to effect closing of the control orifice 36. The bladder pressure then increases, and the air flow eventually reaches its balance point.

It is thus apparent that the control function of the pneumatic circuit is nearly independent of the main supply pressure in duct 10. For a given position of the thermostat, the flow of conditioned air is determined primarily by the pressure that is fed back to relay 38 from the velocity sensor. The feedback signals from the velocity sensor automatically compensate for variations in the main supply pressure to provide a control circuit which is pressure independent for all practical purposes.

The small pressure dependencies that are present in the control circuit arise from the fact that the supply pressure in duct 10 is transmitted to opposite sides of diaphragm 40. Changes in the supply pressure are transmitted through conduit 44 and orifice 46 to the bottom of the diaphragm, thus tending to close orifice 36 and decrease the air flow with increasing supply pressure. This effect is small compared to the feedback from velocity sensor 28 because orifice 46 is smaller than orifice 58. Countering this effect is the effect of the application of the main supply pressure to the top of the diaphragm through conduits 30 and 34. This pressure tends to open orifice 36 with increasing supply pressure, thereby increasing the air flow. Again, the feedback from the velocity sensor is much greater than the effect of the supply pressure because the area under orifice 36 is small compared to the total area of the diaphragm.

These two pressure dependent effects oppose one another and thus tend to cancel. By proper selection of the sizes of orifices 46, 48 and 58 as indicated previously, they can be made to exactly cancel or become negligible. If a needle valve or other adjustable restriction is used in conduit 50 to control the maximum flow, the size of orifice 48 compared to orifices 46 and 58 is effectively changed and the pressure independence of the control system is destroyed.

The amplifying relay 38 provides both flow gain and pressure gain so that a small orifice thermostat controls a relatively high flow into and out of the bladder 18, thus providing a quick response to changes in the demand for conditioned air. A number of different units operating at radically different supply pressures can be controlled from a single thermostat without significant adverse effects, because all of the control pressures and signals are referenced to a single common pressure (atmospheric pressure). The velocity signals from all of the units are independent of supply pressure since the velocity signals depend only on the flow through the respective diffusers.

Rather than adding a high velocity pressure or pressure differential on the high pressure side of the bladder, the pneumatic circuit utilizes the pressure drop across the diffuser downstream of the actuator bag for control purposes. This pressure differential is necessary for good air distribution in the occupied space, so it is not necessary to add any pressure at all for control purposes. Consequently, the number of pressure sensitive components is minimized and the fan energy is not used for purposes of control. Since only a single diaphragm 40 is necessary in order to achieve control that is virtually independent of pressure, the pneumatic circuit is reduced in cost and complexity as compared to control systems which require a number of diaphragms and similar pressure sensitive elements. It is to be understood that the pneumatic control circuit functions equally well to control the distribution of heated air.

Without the adjustment mechanism shown in FIGS. 3 and 4, the maximum air flow through slot 12 is constant. The adjustment mechanism provides for adjustment of the maximum flow rate simply by rotating cam 86. For example, by rotating the cam 180° from the solid line position of FIG. 4 to the broken line position, the air flow is adjusted from its minimum setting to its maximum setting. As the cam rotates, its upper camming surface 84 pushes set screw 80 upwardly by camming action to raise disc 72 and the exhaust tube 62. Consequently, the bottom end of tube 62 and the control orifice 36 that is formed therein are moved upwardly from the solid line position to the broken line position. In the broken line position, the orifice is spaced well away from diaphragm 40 so that relatively high pressure is required at flow sensor 28 in order to move the diaphragm upwardly far enough to reach the equilibrium condition of orifice 36. To achieve this high pressure at the flow sensor 28, a high rate of air flow through slot 12 is required, and the maximum rate of flow is relatively high. Conversely, when tube 62 is in the solid line position of FIG. 4, orifice 36 is relatively close to the diaphragm such that a small flow rate can displace the diaphragm upwardly to effect the equilibrium condition of the orifice.

The compression spring 74 maintains the tip of set screw 80 in contact with the cam surface 84 at all times. Therefore, when the cam 86 is moved from the broken line position of FIG. 4 to the solid line position, tube 62 moves downwardly under the influence of the spring. The threaded set screw permits independent factory calibration of the adjustment mechanism in order to compensate for any variations in the mechanical parts. By threading screw 80 upwardly or downwardly, the distance of orifice 36 from diaphragm 40 is adjusted at any particular rotative position of cam 86. The factory calibration is thus completely independent of the field adjustment provided by cam 86. The access hole 76a in mounting plate 76 permits a screwdriver, wrench or other tool to be applied to screw 80 so that it can be recalibrated in the field if necessary. The pointer provides on a scale 90 a visual indication of the setting of the cam, and the setting is preferably indicated in terms of the percent of maximum air flow. For example, when cam 86 is in the solid line position of FIG. 4, pointer 92 could read 50% on the scale to indicate that cam 86 is set at 50% of the maximum flow rate, while in the broken line position the pointer would read 100% on the scale. Halfway in between the solid and broken line positions, pointer 92 would indicate 75% on the scale. The rotative position of cam 86 and thus the reading on the scale corresponds to the distance of orifice 36 from diaphragm 40.

It is pointed out that the adjustment device does not require expensive seals or twisting of any connecting tubes during adjustment. Additionally, there are not off-center or hard to reproduce torques applied to the diaphragm. The introduction of any possible leaks on the high pressure or bottom side of diaphragm 40 is avoided. Any leakage which may occur is restricted to the area above diaphragm 40, and this side of the diaphragm is vented to atmosphere so that any such leaks have no detrimental effect on the system. It is again pointed out that the factory calibration provided by set screw 80 is independent of the field adjustment provided by cam 86, and that neither of these settings alters the size relationship among the orifices 46, 48 and 58. As a result, the adjustment mechanism has no effect on the pressure independence of the control circuit.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In an air distribution system having a duct for receiving conditioned air, an outlet in said duct for discharging conditioned air therefrom, and a pressure actuator for controlling the discharge of conditioned air from the outlet, the combination of:
    means for applying pressure to the pressure actuator for inflation of same to reduce the flow of conditioned air through said outlet;
    an exhaust conduit communicating at one end with said pressure actuator for deflating same to increase the flow of conditioned air through said outlet, said exhaust conduit terminating at the opposite end thereof in a control orifice;
    a pneumatic relay having a housing and a flexible diaphragm in the housing for controlling the bleeding of the pressure from the pressure actuator, said diaphragm having one side located adjacent said control orifice;
    means for venting the housing on said one side of the diaphragm;
    means for applying pressure to the opposite side of said diaphragm to urge the diaphragm toward said orifice to restrict bleeding of pressure from the pressure actuator;
    temperature responsive thermostat means for bleeding pressure from said opposite side of the diaphragm to open said control orifice;
    means for applying to said opposite side of the diaphragm the pressure downstream of said outlet, thereby urging the diaphragm toward said orifice to restrict bleeding of the pressure actuator upon increased flow through said outlet; and
    means for adjusting the distance between said orifice and said diaphragm, thereby adjusting the maximum flow rate of conditioned air through said outlet at the equilibrium flow condition.

2. The combination set forth in claim 1, wherein said adjusting means includes:
    a tube coupled end to end with said exhaust conduit to permit axial movement of the exhaust conduit toward and away from the diaphragm, said tube providing communication between the pressure actuator and said opposite end of the exhaust conduit; and
    means for effecting axial movement of the exhaust conduit toward and away from said diaphragm to vary the distance between said control orifice and diaphragm.

3. The combination set forth in claim 2, wherein said means for effecting axial movement of the exhaust conduit includes:
- a cam follower carried on said exhaust conduit at a location offset from the axis thereof; and
- a cam element mounted on said housing for rotation about the axis of said exhaust conduit and presenting a cam surface in contact with said cam follower, said cam surface interacting in camming fashion with said cam follower to effect axial movement of said exhaust conduit upon rotation of the cam element.

4. The combination set forth in claim 3, including yieldable means for urging said cam follower against said cam surface.

5. The combination set forth in claim 3, including means establishing a threaded connection of said cam follower with said exhaust conduit to permit threaded adjustment of the cam follower in a manner to vary the distance of said control orifice from the diaphragm independently of the rotative position of said cam element.

6. The combination set forth in claim 3, including:
- a scale on said housing; and
- an indicator on said cam element cooperating with said scale to provide thereon an indication of the rotative position of the cam element, thereby providing an indication of the distance between said control orifice and diaphragm.

7. The combination set forth in claim 1, including means for adjusting the distance between said orifice and said diaphragm independently of the first mentioned adjusting means.

8. In an air distribution system controlled by a pneumatic circuit of the type having an inflatable bladder for controlling the distribution of conditioned air, a flexible diaphragm, means for applying pressure to one side of the diaphragm, and thermostat means for controlling the application of pressure to one side of the diaphragm, the improvement comprising:
- a flexible tube communicating at one end thereof with said bladder;
- a second tube coupled with said first tube for axial extension and retraction relative thereto, said second tube terminating in a control orifice located adjacent a side of the diaphragm opposite said one side thereof, whereby the pressure applied to said one side of the diaphragm urges same toward said control orifice to reduce bleeding of pressure from the bladder; and
- adjustment means for extending and retracting said second tube relative to said first tube to vary the distance between said control orifice and diaphragm, thereby adjusting the amount of pressure required against said one side of the diaphragm to effect a predetermined condition of inflation of the bladder.

9. The improvement set forth in claim 8, including means for effecting extension and retraction of said second tube relative to said first tube independently of said adjustment means.

10. The improvement set forth in claim 8, wherein said adjustment means includes:
- a cam member supported for rotation about the axis of said second tube and having a cam surface inclined relative to the axis of said second tube;
- a disc carried on said second tube and projecting outwardly thereof;
- a cam follower extending from said disc at a location outboard of the second tube, said cam follower having a tip portion in contact with said cam surface whereby rotation of said cam member effects camming action between said cam surface and cam follower to extend and retract said second tube; and
- means urging said cam follower in a direction to maintain said tip portion against said cam surface.

11. The improvement as set forth in claim 10, wherein said cam follower is in the form of a screw element having a threaded connection with said disc to permit adjustment of the distance between said tip portion and disc, thereby providing for extension and retraction of said second tube relative to said first tube independently of the rotative position of said cam member.

12. The improvement as set forth in claim 11, including a stationary mounting bracket adjacent an end of said screw element opposite the tip portion thereof, said mounting plate having an access hole therein adjacent said end of the screw element providing access to same for adjustment of the screw element.

13. The improvement as set forth in claim 12, wherein said urging means comprises a compression spring engaging said mounting bracket at one end and said disc at the opposite end to continuously urge said disc generally toward said cam member.

14. The improvement set forth in claim 10, including:
- a housing containing said diaphragm and having a surface adjacent said cam member;
- a graduated scale on said surface of the housing; and
- an indicator on said cam member cooperating with said scale to provide an indication thereon of the extended position of the second tube relative to the first tube.

* * * * *